United States Patent [19]
de Monbrison

[11] Patent Number: 4,493,163
[45] Date of Patent: Jan. 15, 1985

[54] HYDROPONIC CULTURE METHOD FOR ANIMAL FOOD AND DEVICE FOR CARRYING OUT SAID METHOD

[75] Inventor: Christian de Monbrison, Paris, France

[73] Assignee: Agro-Technics International Ltd., London, England

[21] Appl. No.: 364,180

[22] Filed: Apr. 1, 1982

[30] Foreign Application Priority Data

Apr. 2, 1981 [FR] France ............... 81 06666
Mar. 2, 1982 [FR] France ............... 82 03444

[51] Int. Cl.³ ............................................. A01G 9/02
[52] U.S. Cl. ....................................................... 47/61
[58] Field of Search .............. 47/14, 15, 16, 60, 61, 47/59, 60, 62, 61

[56] References Cited

U.S. PATENT DOCUMENTS

| | | | |
|---|---|---|---|
| 987,805 | 3/1911 | Von Der Kammer | 47/60 |
| 2,051,460 | 8/1936 | Skrbensky | 47/60 X |
| 2,051,461 | 8/1936 | Lee | 47/60 |
| 2,121,461 | 6/1938 | Widmann | 47/16 X |
| 2,917,867 | 12/1959 | Bailey | 47/60 |
| 2,963,819 | 12/1960 | Hoch | 47/17 |
| 3,458,951 | 8/1969 | Martin | 47/60 |

FOREIGN PATENT DOCUMENTS

| | | | |
|---|---|---|---|
| 257255 | 1/1967 | Austria | 47/60 |
| 2914607 | 10/1980 | Fed. Rep. of Germany | 47/17 |
| 857501 | 9/1940 | France . | |
| 1530123 | 6/1968 | France . | |
| 1374076 | 11/1974 | United Kingdom | 47/61 |

Primary Examiner—Robert A. Hafer
Assistant Examiner—D. D. DeMille
Attorney, Agent, or Firm—Brumbaugh, Graves, Donohue & Raymond

[57] ABSTRACT

The present invention relates to a hydroponic culture method for animal food, regrouping semi-automatically and in a single device, five germinating operations, on superimposed trays, namely, propagating the seeds on the trays, soaking said seed directly on said trays, programmed irrigating of the seeds and roots, heating by way of electrical elements incorporated in the trays, and if necessary injecting nutrient solutions by quantity-controlling pumps.

The invention further relates to the device usable for carrying out said method.

3 Claims, 9 Drawing Figures

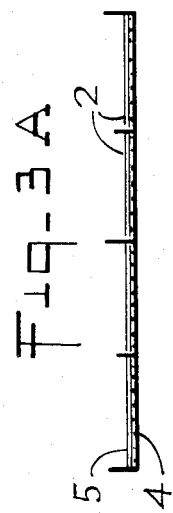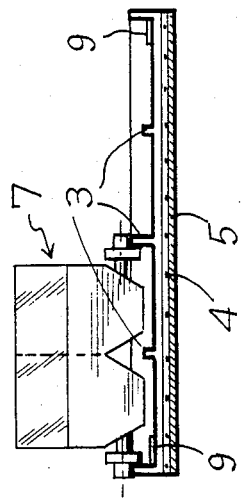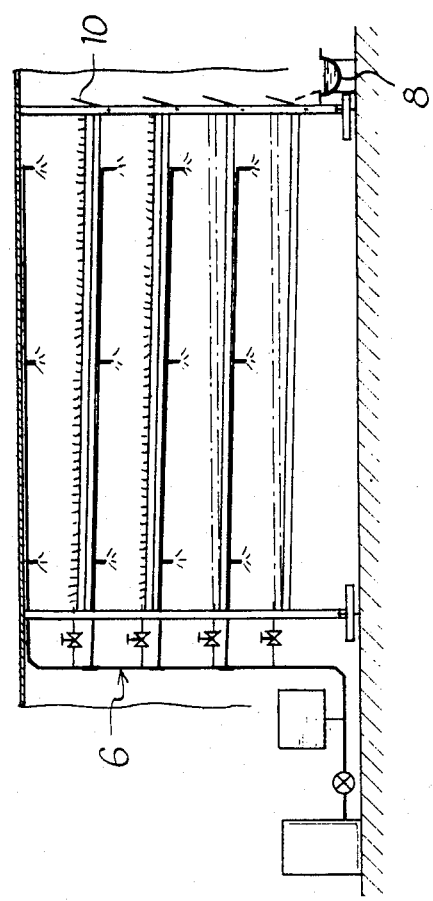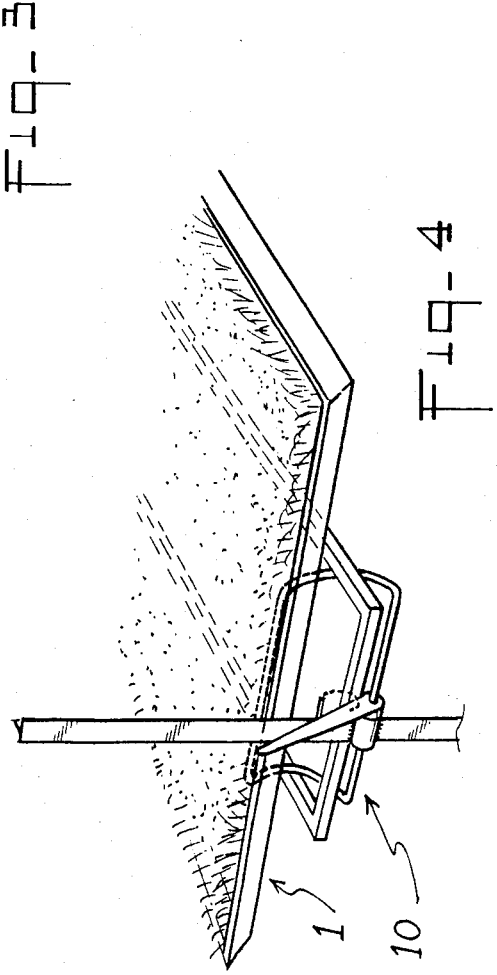

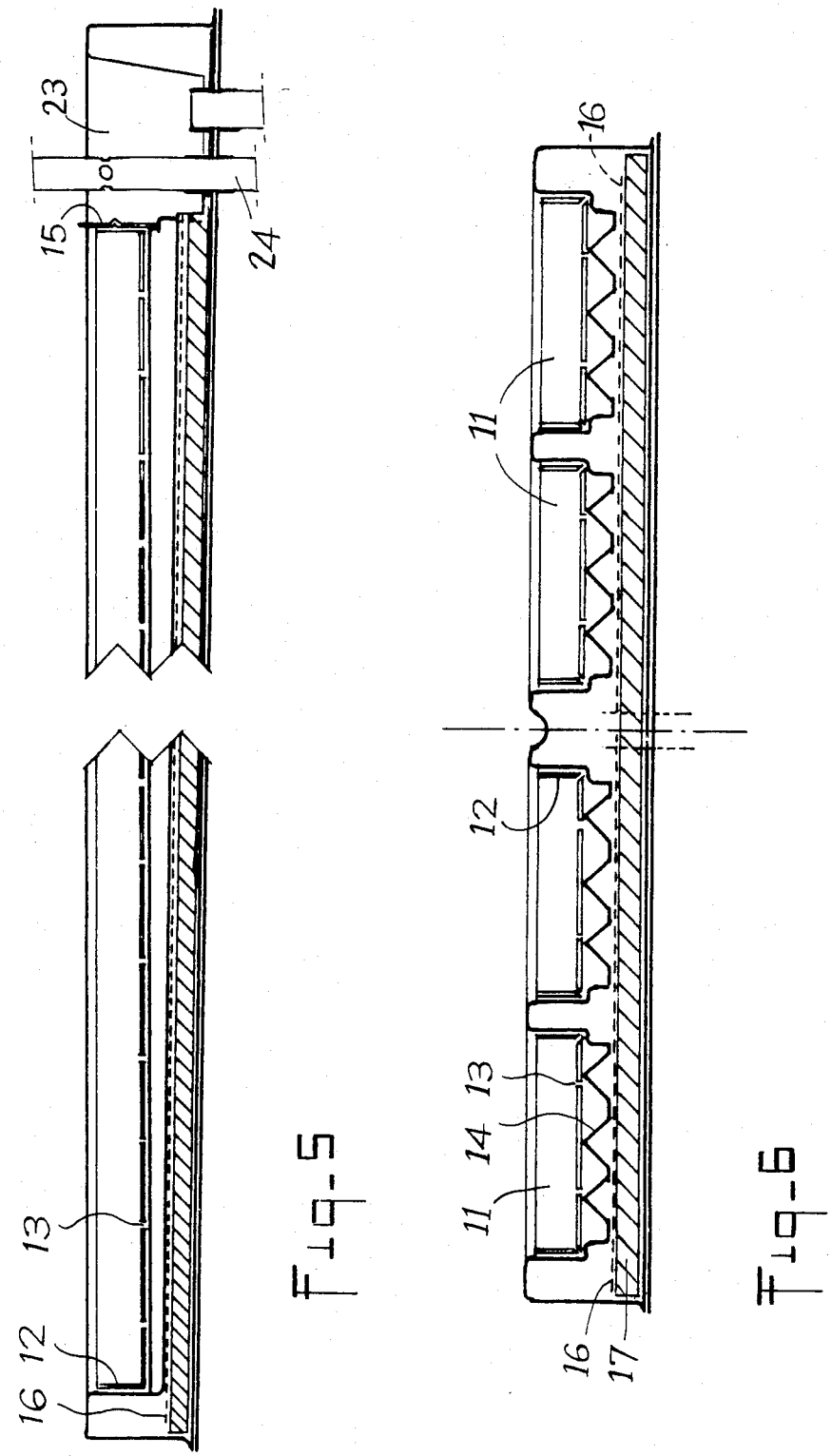

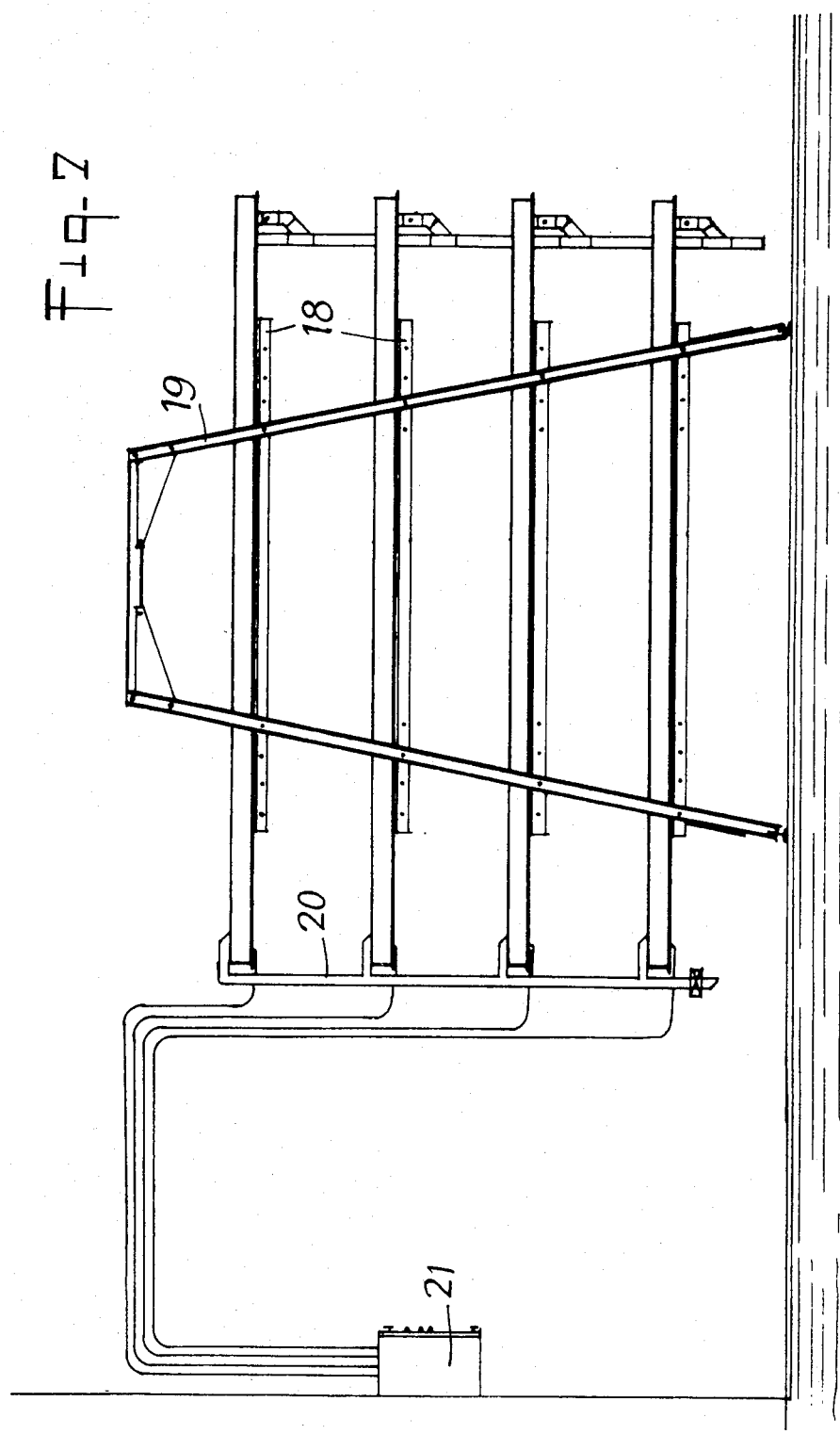

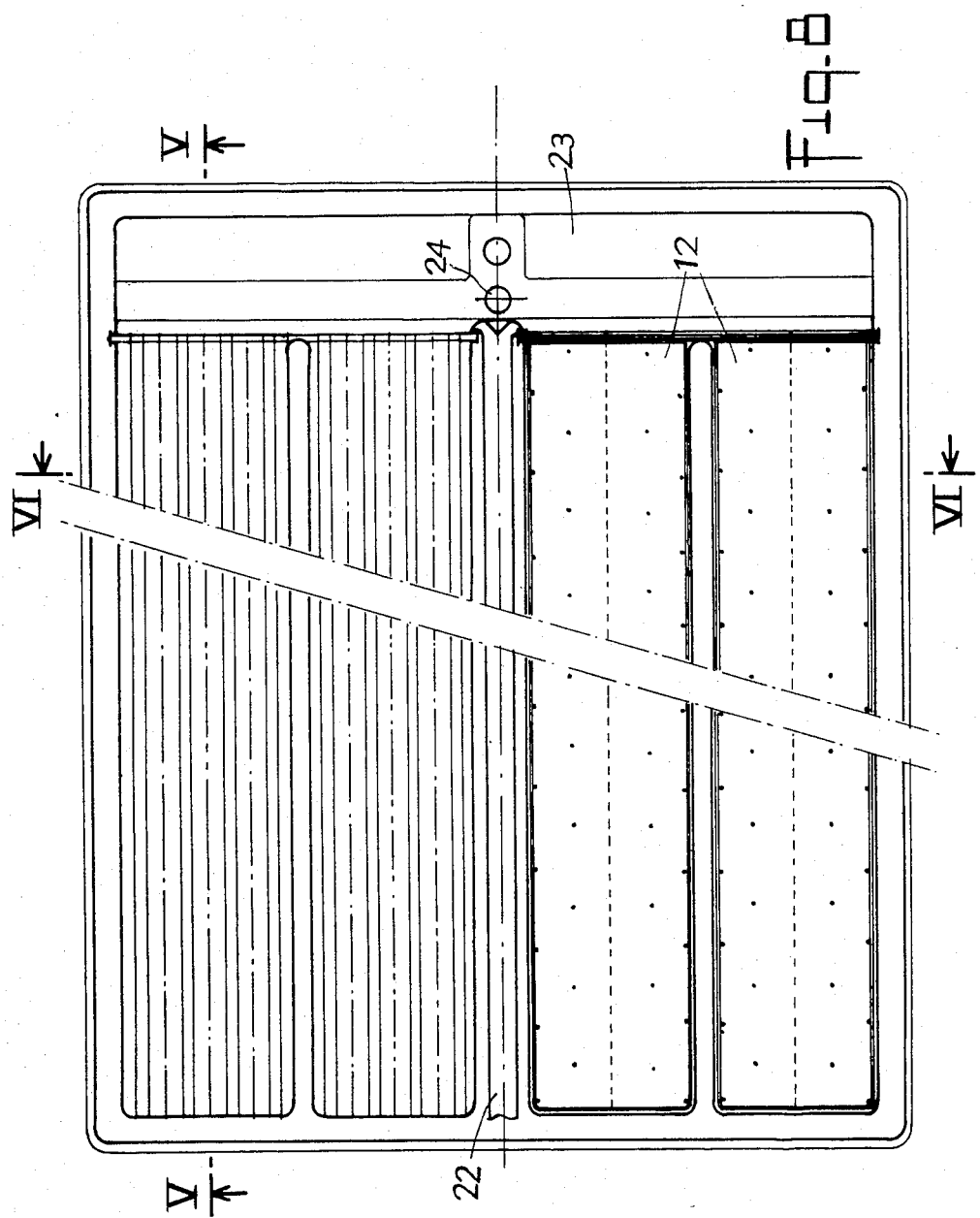

HYDROPONIC CULTURE METHOD FOR ANIMAL FOOD AND DEVICE FOR CARRYING OUT SAID METHOD

The aim of the method and device according to the invention is to germinate and cultivate on trays and over short periods the seeds normally used, either pure or in mixture, as basic food or as complements in any proportions, for feeding cattle and smaller live-stocks, poultries, and reared game.

The invention relates more particularly to improvements to existing culture methods with a view to integrating in semi-automatic manner in a single device, the five operations of culture on superimposed trays, as follows:

spreading of the seeds on the culture trays, whether by hand or by means of a dispensing hopper;

soaking of the seeds directly on the culture trays;

programmed irrigation of the seeds and roots;

keeping seeds and roots at constant temperature by heating the trays under thermostat control;

and if required, injection of set quantities of nutrient solutions in the soaking water.

Hydroponic cultures of animal food are already known. They consist in scattering the pre-soaked seeds in so many superimposed trays that a crop is obtained everyday from one tray, germination lasting between 8 and 15 days, depending on the case.

All the methods used until now show the following major disadvantages:

they require the operations to be conducted in a room or building heated at a constant temperature of 20° C., which proves very expensive from the point of view of energy consumption;

the germination step requires always a pre-soaking of the seeds, in soaking tanks and in several manipulations, over three days, before the water-loaded seeds can be spread by hand on small trays of low productive capacity, thus the methods result in excess labor costs;

the watering of the seeds, by hand or by some automatic system was very uneven, and thus less productive since there was an irregular germination;

the equipment used was generally unreliable, liable to rust and often complex to handle.

The foregoing disadvantages have until now prevented this type of equipment from reaching the industrial level and from meeting the requirements of industrial cattle farming where the labour and energy factors take primary importance.

A long period of experimenting has led the Applicant to discover that the period of soil-less or hydroponic culture should be eight days, for the following reasons:

(1) During the first eight days of the life of a cultivated seed, the seed develops a root system after a first period of swelling. The roots rapidly spread out to feed the future plant with nutrient elements, and in particular water. To do this, the biological processes of the seed synthesize large quantities of phytohormones and vitamins to promote the growth of the radicle and the plantlet issued from the seed.

(2) From the third or fourth day, an aerial part begins to grow. On the fifth day the mechanisms of photosynthesis begin. The plant thus uses the light energy to synthesize the organic matter, the glucides before anything else.

(3) The eight-day period also enhances advantageous returns due to the shortness of the full cycle of culture.

(4) In summary, the eight-day culture period provides:

the most advantageous root development from the point of view of phytohormones and vitamins;

the most favorable growth of plantlets from the point of view of fresh green matter, rich in vitamins from photosynthesis;

a very important multiplication of enzymes which will give to the product a catalytic effect excellent for helping animal digestion;

a seed that remains fertile and has kept all its nutrient value;

savings in culture time.

The device used to carry out the method according to the invention consists of eight trays resting on a frame, for an eight-day cycle of culture, so that the planting of one tray per day will give, after the first eight days, a daily crop from one tray having reached the end of its growing cycle.

The method and device according to the invention differ from the prior known methods and devices in that:

(a) the apparatus is completely autonomous and requires no specially heated atmosphere. It only needs to be placed inside a room which receives daylight;

(b) the trays are fixed and in one piece. They require no handling throughout the culture and are easy to clean after a crop;

(c) the design of the heatable trays and their inclination enable them to be kept at the required temperature, and to soak and drain the seeds;

(d) the seeds are therefore soaked on the culture trays proper, this eliminating the necessity of prior soaking and handling of the germinated seed;

(e) fertilizers in the soaking water are not necessary, so that the resulting product is a completely natural product, the seeds developing under the action of water, heat and sunlight;

(f) When harvesting the product, the strips of cultivated seeds, pulled out by sliding from the apparatus have a cleaning action on the trays.

The method according to the invention has been defined so as to allow a daily production of 100 kg of green fodder from 20 to 25 kg of seeds, in eight days of culture.

It should be noted that for reasons of efficiency, most of the experiments were conducted with barley, a cheap, readily available grain which is consumed by most animals. However, any and all types of cereals or leguminous plants can be used with the method according to the invention.

The present invention also relates to the device used for carrying out the aforementioned method and comprising eight culture trays, so arranged as to form two modules of four superimposed trays. Each module has its own supporting frame. Said trays are supplied with water, heated, and comprise a water-draining device, the whole being controlled by an electrical unit containing all the operation control programming means.

The present invention will be more readily understood on reading the following description with reference to the accompanying drawings in which;

FIG. 2 is a longitudinal cross-section of said module.

FIG. 3 is a cross-section of a tray equipped with a dispensing hopper.

FIG. 4 shows the system for lifting the trays.

FIG. 5 is a longitudinal cross-section along II—II and FIG. 6 is a cross-section along III—III of a tray.

FIG. 7 is an elevational view of a module showing the water and electrical supply to the trays.

FIG. 8 is a view from beneath a tray.

Figure 1:
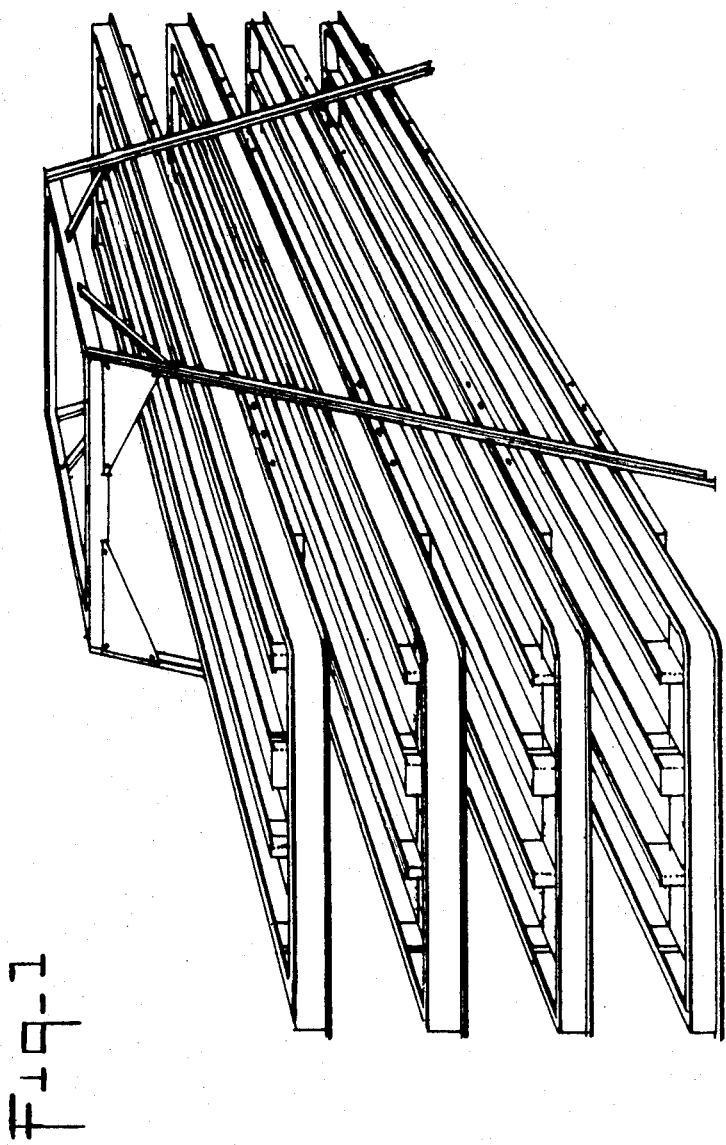
FIG. 1 shows a module consisting of four trays resting on a frame.

The trays 1 are designed so that their four edges are raised and so that they can also be used for soaking the seeds.

Said trays are also divided lengthwise by three projecting ribs 3 forming four compartments 2 (about 25 cm wide and 3 m long). This enables the production of four strips of animal food weighing about 25 kg each, said strips being easy to handle and to distribute and sliding freely out of the trays.

The trays can also be composed of separately formed compartments joined together.

There are two possible alternatives to the constitution of the trays. According to a first embodiment (FIG. 3), two plates made of PVC or treated painted metal, are bonded together at their ends, and between them is fixed a system of electrical elements (4) and in particular a heating film such as that commercialized under the trade name Calfilm by the company Semme, to heat the upper part of the trays. The heating film is itself isolated from the lower plate by an insulation 5 (in polyester or the like) in order to keep the heat upwards. Likewise, between the electrical elements and the upper plate, a layer of air can be provided to evenly distribute the heat.

According to a second embodiment (FIG. 3A) the trays form containers and comprise, at the bottom a heating film 4 which is itself covered with simple or rigid protective insulation 5 in PVC or other material.

A thermostat is fixed on each tray to control the temperature.

Each tray is placed at an angle on each one of the supports of the frame, the height varying by 20 cm between the upstream side and the downstream side (front of the device) to allow the sprayed water to be drained downstream leaving time to the seed and to the plantlet to absorb the quantity of water that it requires.

Said trays can however be tilted to a horizontal position to allow the seeds to soak.

Said tilting movement is controlled by a fixed lever 10 situated at the front of the tray on the central and vertical bracket of the T-shaped support. Lever 10 is an incurved plate mounted for pivoting about a horizontal hinge and controlled by a lever. The plate bears against the edge of the culture tray so as to raise and lower the tray.

A watering system 6 by mist-like spraying is fixed by any standard means along the transverse support above each tray. There are three or four jets per level, the idea being to cover evenly the whole surface of the tray.

The spraying water is brought to the level of each tray by ramps in PVC situated along the rear vertical bracket of the frame, and along the transverse bracket supporting lengthwise the tray-supporting bars.

A small water supply is provided at the level of each tray in the ramp bringing the water, in order to allow watering along the roots whenever necessary, which supply can be cut off by means of a cock or valve. Said water supply is also used to bring in the soaking water.

A dispensing hopper 7 has been especially designed to allow the propagation of the seeds on the trays, in the right quantity and in two compartments at a time. Said hopper can, due to runners, readily run over the ribs of the tray, spreading perfectly evenly the desired quantity of seeds.

The hopper comprises a telescopic rod for easy handling.

A gutter 8 is provided at the base of the frame, at the downstream front end, along the device, to remove any excess of water.

The water excesses are brought to the gutter by siphons or outlets 9 closed by a small grid and by a plug and fixed at the front of the trays. The water is drained from the trays towards the gutter 8 via a siphon system 9 or via a conduit 9 whose orifice is closed by a plug member.

A regulating pump is installed where the water arrives for those cases where a nutrient solution is used, said solution being added in the desired quantity to the sprinkling water.

The top of the frame is provided with a roof or shade in non-transparent PVC in order to give to the two upper trays the same effect as to the lower trays. It is further possible to fix on said shade vertical hangings in PVC or other supple plastic material, in order to insulate the device as much as possible from the cold surroundings, if necessary.

The system works as follows:
In the morning:

(1) The green fodder is removed from the tray which has reached complete germination, i.e. after 8 days, by sliding the four strips of fodder out of the tray.

(2) The tray is cleaned with a brush and a solution of parozone.

(3) The dispensing hopper is placed on the tray and filled with seeds (about 5 kg of barley per compartment, i.e. 10 kg for a double hopper).

(4) The seeds are spread evenly on the tray.

(5) The tray is brought into a horizontal position by way of the lever system.

(6) The soaking water is brought by the supply inlet provided to this effect (about 20 liters).

(7) The thermostat is set to zero, the soaking taking place in cold water.

In the evening, after eight hours' soaking:

(8) The tray is tilted.

(9) The thermostat is set to the required temperature (15° to 18° C.).

(10) The programmed watering takes place automatically (it does not in any way interfere with the soaking).

(11) On the 4th day, when the root layer is thick, some water can be brought along the roots.

On the morning of the 9th day: The operation is repeated for another tray.

It is noted that after the morning operations, the fodder is normally distributed to the animals once cut by a cutting machine or ground by a grinder.

According to a variant embodiment of the invention the characteristics of the device according to the invention are improved as follows:

The heating trays have a double bottom forming a perforated inside tray resting on a slightly inclined base. This new characteristic of the trays enables, on the one hand, to leave the trays completely stationary throughout the full culture period, the seeds being simply drained out, without having to tilt the trays; on the other hand, the irrigating of the seeds and roots is done only by the water raising inside the space provided in the double-bottom of the trays, the mist-like spraying of the seeds being done away with.

According to another characteristic of the second variant of the device, the soaking and irrigating water is brought automatically to the tray at the desired time and in controlled quantity.

The perfect control of the quantity of water, as a result of (a) irrigation through the bottom of the trays and (b) the draining system, permits the water to be either recycled or given to the animals to drink.

Figure 9:
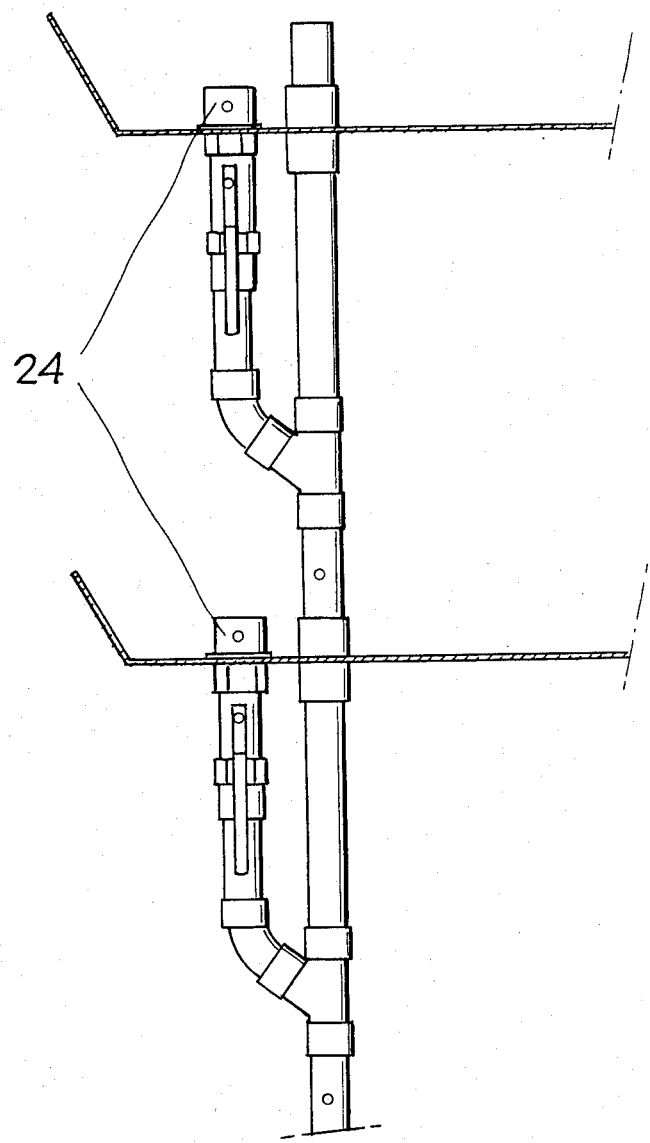
FIG. 9 shows in detail the draining device.

According to another variant embodiment of the device according to the invention (FIGS. 5 to 9), the cultivating trays are molded in thermoplastic materials, preferably white in color, with a smooth surface to facilitate cleaning.

To this effect, the trays are divided into four molded compartments (having for example a width of 23.5 cm and a length of 3 m) as shown in crosssection in FIG. 6.

Each compartment 11 receives an inner tray 12 which stays in the compartment when the crop is removed and in which the culture will be carried out. The inner tray is perforated, the holes 13 being in staggered arrangement (about every 15 cm for example), all over its length. The inner tray rests on ribs 14 providing a space or plenum inside the double bottom of the tray; the plenum allows the circulation of the soaking and irrigating water.

The bottom of the compartments are longitudinally inclined from the back towards the front whereas the inner trays are set horizontally because of the actual shape of the ribs forming the plenum.

Said inner trays are locked in position at the front by front plates 15 which at the same time prevent the seeds and roots from running over. The outer tray is open on the side of the front plate 15 which is positioned in such a way as to block the inner tray 12. The front plate is removed to bring the layer of formed plantlets out of the tray. The movement of pulling the layers out of the tray cleans the bottom of the tray.

The trays are heated by means of a heating film incorporated to the bottom of the tray, as described hereinabove in the first variant. Due to a thermostat, the individual temperature of each tray is automatically kept at the desired level.

The self-heating trays provide a production unit which is completely autonomous and requires no other heating means from the building. Accordingly, the building need only be moderately insulated.

The heating film 16 is placed between:

at the top, an antistatic screen based on a metallic paint, or a metallic sheet; and underneath, an insulating layer 17 against thermal losses, protected at the bottom part by a sheet of plastic welded to the specially molded heel portion of the upper part of the tray.

The trays supporting frames will now be described:

Each tray, of each module, is supported by a rectangular frame 18 (FIG. 7) constructed in rigid section pieces, assembled by reinforcing brackets.

Said frames are integral with the supporting frame 19 proper by means of large-size bolts.

It are to be noted that there is no mechanisms on these frames. This provides a high rigidity and makes assembly and dismantling an easy operation requiring no special training or equipment. As a result, maintenance is reduced to normal cleaning.

The anti-rust treatment of the section pieces as well as the absence of water-spraying means give these frames a long working life.

According to the invention, the seeds are soaked by immersion and the roots are irrigated, both these operations being automatically controlled by programming the time(s) and period(s) of admission and cutting-off of the water.

The irrigation water is first brought by a very simple pipe system provided, upstream, with controlled valves. More specifically, the water is brought at the normal pressure by a central rack 20 (FIG. 7) placed at the inlet to the frame, issuing into a central channel 22 (FIG. 8) which channel flows into the front channel 23 of the tray, to thereafter return under the secondary trays and gradually irrigate the seeds and the roots by total immersion.

The fertilizer-free water flows into the plenums to irrigate the culture by immersion. This type of irrigation under atmospheric pressure at the level of the trays, eliminates all risks of water being projected into the building. The perfect control of the quantity of water makes it easy, either to recycle said water or to give it to the animals to drink.

To control the quantities of water supplied to the culture as well as of the irrigation period, the apparatus according to the invention is equipped with a draining system 24, working as follows:

when irrigation starts, draining is cut off by an electro valve or by any normal electro-mechanical system requiring but a minimum of maintenance. The electrovalve is adjusted, for example, by an electric clock or by hand using a switch.

the soaking time can then be adjusted to the variety of the cultivated seeds, and the draining is automatically carried out by adjusting the electronic control;

the soaking period on the first day of culture is controlled by hand or mechanically; it is generally set to between 8 and 24 hours. For the other days, the irrigation period is about 15 minutes.

The control unit 21 (FIG. 7) contains the circuits which process the information received from the culture trays and control the different variables to obtain a good development of the culture:

(a) the temperatures of the cultures, at each one of their progressing stages, are recorded by eight temperature probes placed at the very level of said cultures (one probe per tray);

(b) eight thermostats, programmed in relation to the varieties of seeds used, record information received from the probes and control the heating of the trays;

(c) an electric or electronic adjustable clock gives the possibility to choose any irrigation and soaking time variables;

(d) Each one of the stages of information feeding, both in input and output, of information processing and of controls is protected by safety systems selected in relation to their reliability and to their conformity with the currently applied rules.

It is to be noted that the design of these heating trays with double bottom (the inner perforated tray resting horizontally on a slightly inclined base, by way of ribs) favors the combination of the three main operations, namely:

keeping the trays at a required temperature;

soaking of the seeds;

draining of the seeds.

The culture program is conducted as follows:

1st day:

In the morning, the tray being between cycles, emptied of its crop and cleaned (manually or automatically)

the seeds are deposited by hand or by a dispensing hopper on the tray which will bear the culture through the eight-day cycle.

At the end of the selected soaking time, the water is drained manually or automatically and the tray enters the culture cycle without any further outside intervention until the crop is collected.

The combination of the system of control of the temperature of the trays, with the systems of irrigation and draining enable the system to achieve optimum results throughout the whole culture cycle; so that on the following days:

2nd day:

The seeds swell in the best possible conditions of irrigation and temperature.

3rd day:

It is already possible to see on many seeds in the morning, and on the quasi-totality of the seeds in the evening, the forming radicles coming through.

4th day:

The roots are beginning to grow faster. The volume of the culture has increased considerably.

5th day:

The plantlets, already coming through on the evening before, start to develop and take on a light green color which announces the beginning of the photosynthesis.

6th day:

The white layer of roots is fully expanding and the mass of the seed starts to come over the edges of the trays.

During the day, the plantlets start to bloom into final leaves.

7th day:

The roots form a uniform and already compact mass.

The leaves grow more and at the end of the day cover the tray with a thick green layer.

The photosynthesis is in full action.

8th day:

A fact to be noted is that this day is one of the most spectacular phases. Indeed, between the morning of the 8th day and the morning of the 9th day, the green mass is seen to double.

The roots have already formed an indissociable mass.

9th day:

On the morning of the ninth day, the culture comes to an end. The product is ready for consumption by the animals.

Once the front plates closing off the compartments have been removed, it suffices to pull on the strips of product, to slide them out of the tray and cut them or roll them up for transport.

This easy extraction of the product is coupled with a self-cleaning effect of the bottoms of the compartments. Once the product is removed, the inside of the trays is clean and ready to receive the seeds for the next cycle of culture.

In the method such as described, each tray produces, between 20 and 25 kg of seeds, i.e. about 120 to 140 kg of food in eight days.

The same device can be produced smaller and thus be used by smaller-scale breeders.

Moreover, in hot and dry countries, similar devices can be produced with the same characteristics as indicated hereinabove but without the heating system.

What is claimed is:

1. A device for carrying out hydroponic culture for producing fodder for animal food from seeds which comprises a framework open to the atmosphere provided with supports on which rest a number of superimposed culture trays, each culture tray being provided with
    (a) a double bottom having an upper and lower plate, an electrical heating device fixed within said double bottom, an insulating plate disposed between said heating device and said lower plate such that a layer of air is provided between said heating device and said upper plate, wherein said upper plate is longitudinally inclined and carries horizontally leveled longitudinal ribs which support inner perforated trays containing said seeds, whereby a space is provided between said upper plate and the bottom of said inner trays, between said longitudinal ribs, such that water supplied in said space soaks or irrigates the seeds and roots contained in said inner trays or drains through a water draining system downstream of said inclined upper plate,
    (b) a water supply piping system to introduce soaking water or irrigating water in said culture tray at the bottom thereof,
    (c) a draining system for draining said soaking water or irrigating water,
    (d) programming means for controlling the water supply system and the draining system to regulate the soaking time, the irrigation time and the quantity of water supplied for soaking or irrigating, and
    (e) means for controlling the heating system of said culture tray to maintain the seeds and roots at a constant temperature.

2. A device according to claim 1 which comprises eight culture trays arranged in two modules of four superimposed trays.

3. A device according to claim 1 wherein said electrical heating device is an electrical heating film.

* * * * *

UNITED STATES PATENT AND TRADEMARK OFFICE
CERTIFICATE OF CORRECTION

PATENT NO.   : 4,493,163

DATED        : January 15, 1985

INVENTOR(S)  : Christian de Monbrison

It is certified that error appears in the above-identified patent and that said Letters Patent is hereby corrected as shown below:

<u>Title page, 2nd col.</u>, following the third line, insert:

--752799          Belgium--;

<u>Col. 1, line 36</u>, delete "always";

<u>Col. 3, line 10</u>, "Said" should read --The--.

Signed and Sealed this

Twenty-eighth Day of May 1985

[SEAL]

Attest:

DONALD J. QUIGG

*Attesting Officer*    *Acting Commissioner of Patents and Trademarks*